United States Patent
Terao

(10) Patent No.: US 12,233,776 B2
(45) Date of Patent: *Feb. 25, 2025

(54) VEHICLE APPROACH NOTIFICATION DEVICE AND PICKING TRUCK EQUIPPED WITH THE DEVICE

(71) Applicant: Mitsubishi Logisnext Co., Ltd., Kyoto (JP)

(72) Inventor: Ryohei Terao, Kyoto (JP)

(73) Assignee: Mitsubishi Logisnext Co., Ltd., Kyoto (JP)

( * ) Notice: Subject to any disclaimer, the term of this patent is extended or adjusted under 35 U.S.C. 154(b) by 137 days.

This patent is subject to a terminal disclaimer.

(21) Appl. No.: 18/167,886

(22) Filed: Feb. 13, 2023

(65) Prior Publication Data
US 2024/0149785 A1    May 9, 2024

(30) Foreign Application Priority Data
Nov. 4, 2022  (JP) .................. 2022-177379

(51) Int. Cl.
*B60Q 1/50* (2006.01)
*B60Q 1/26* (2006.01)
(Continued)

(52) U.S. Cl.
CPC ........... *B60Q 1/543* (2022.05); *B60Q 1/2692* (2013.01); *B60Q 1/30* (2013.01); *B60Q 1/46* (2013.01);
(Continued)

(58) Field of Classification Search
CPC .... B60Q 9/008; B60Q 2400/50; B60Q 1/543; B60Q 1/22; B60Q 1/2607; B60Q 1/56; B60Q 1/04
See application file for complete search history.

(56) References Cited

U.S. PATENT DOCUMENTS 6,364,513 B1 * 4/2002 Fong ................. B60Q 1/22
362/540
11,813,979 B1 * 11/2023 Terao ................. B60Q 1/28
(Continued)

FOREIGN PATENT DOCUMENTS

| EP | 2754584 | 1/2021 |
|---|---|---|
| JP | 2003306299 | 10/2003 |

(Continued)

OTHER PUBLICATIONS

Office Action of European Counterpart Application, issued on May 8, 2024, pp. 1-5.
(Continued)

*Primary Examiner* — Wei (Victor) Y Chan
(74) *Attorney, Agent, or Firm* — JCIPRNET

(57) ABSTRACT

The disclosure provides a vehicle approach notification device and a picking truck. A vehicle approach notification device includes a first illumination portion provided on a cab capable of elevation, a second illumination portion provided on a vehicle body incapable of elevation, and a control unit that (1) turns on or blinks the first illumination portion and turns off the second illumination portion when a travel state of the vehicle body is backward travel and an elevation position is lower than a predetermined threshold value; (2) turns off the first illumination portion and turns on or blinks the second illumination portion when the travel state is backward travel or travel stop and the elevation position is equal to or higher than the threshold value; and (3) turns off the first illumination portion and the second illumination portion when the travel state is forward travel.

18 Claims, 5 Drawing Sheets

(51) Int. Cl.
  *B60Q 1/30* (2006.01)
  *B60Q 1/46* (2006.01)
  *B60Q 1/54* (2006.01)
  *B66F 17/00* (2006.01)
  *H05B 47/105* (2020.01)
  *H05B 47/155* (2020.01)

(52) U.S. Cl.
  CPC .............. *B60Q 1/54* (2013.01); *B66F 17/003* (2013.01); *H05B 47/105* (2020.01); *H05B 47/155* (2020.01); *B60Q 2400/20* (2013.01); *B60Q 2400/50* (2013.01)

(56) References Cited

U.S. PATENT DOCUMENTS

| | | | | |
|---|---|---|---|---|
| 2004/0201673 | A1* | 10/2004 | Asai | B60R 1/30 348/148 |
| 2015/0165963 | A1* | 6/2015 | Salter | B60Q 3/68 315/77 |
| 2017/0101147 | A1* | 4/2017 | Hasegawa | B62J 50/25 |
| 2017/0113604 | A1* | 4/2017 | Asaoka | B60Q 1/346 |
| 2017/0217361 | A1 | 8/2017 | Miller | |
| 2022/0242306 | A1* | 8/2022 | Paradis | B60Q 1/381 |
| 2024/0149785 | A1* | 5/2024 | Terao | B60Q 1/30 |

FOREIGN PATENT DOCUMENTS

| | | |
|---|---|---|
| JP | 2019099079 | 6/2019 |
| JP | 6984987 | 12/2021 |

OTHER PUBLICATIONS

"Search Report of Europe Counterpart Application", issued on Aug. 29, 2023, pp. 1-9.

* cited by examiner (A) Forward travel (B) Stop (C) Backward travel (A) Forward travel (B) Stop (C) Backward travel

VEHICLE APPROACH NOTIFICATION DEVICE AND PICKING TRUCK EQUIPPED WITH THE DEVICE

CROSS-REFERENCE TO RELATED APPLICATION

This application claims the priority benefits of Japanese application no. 2022-177379, filed on Nov. 4, 2022. The entity of the above-mentioned patent application is hereby incorporated by reference herein and made a part of this specification.

BACKGROUND

Technical Field

The disclosure relates to a vehicle approach notification device that notifies a person in the vicinity of an approaching vehicle by irradiating light onto the road surface around the vehicle, and a picking truck equipped with the device.

Related Art

Conventionally, there has been known a picking truck equipped with a vehicle approach notification device including a first illumination portion and a second illumination portion (see, for example, Patent Literature 1: JP 6984987). The first illumination portion is provided on a cab capable of elevation in a vehicle, and irradiates a first notification light toward a road surface behind the vehicle when an elevation position of the cab is lower than a predetermined threshold value, that is, at low lifting height. On the other hand, the second illumination portion is provided on a vehicle body incapable of elevation in the vehicle, and irradiates a second notification light toward the road surface behind the vehicle when an elevation position of the cab is equal to or higher than a threshold value, that is, at high lifting height. According to this vehicle approach notification device and the picking truck, in the case of high lifting height in which the first notification light from the first illumination portion is not delivered to the road surface sufficiently, the second illumination portion irradiates the second notification light toward the road surface instead of the first illumination portion, thereby reliably notifying a person in the vicinity of approach of a vehicle.

However, in the above-described conventional vehicle approach notification device and the picking truck, the first illumination portion or the second illumination portion is turned on even when notification to the rear of the vehicle is unnecessary, so it cannot be said to be efficiently power-saving.

The disclosure provides an vehicle approach notification device and a picking truck that have the same notification effect as that of a conventional device but are more power efficient than the conventional device.

SUMMARY

A first vehicle approach notification device according to the disclosure includes a first illumination portion provided in a cab capable of elevation in a vehicle and irradiating a first notification light toward a road surface behind the vehicle; a second illumination portion provided on a vehicle body incapable of elevation in the vehicle and irradiating a second notification light toward the road surface; and a control unit controlling a lighting state of the first illumination portion and the second illumination portion according to a travel state of the vehicle body and an elevation position of the cab. The control unit (1) turns on or blinks the first illumination portion and turns off the second illumination portion when the travel state is backward travel and the elevation position is lower than a predetermined threshold value; (2) turns off the first illumination portion and turns on or blinks the second illumination portion when the travel state is backward travel or travel stop and the elevation position is equal to or higher than the threshold value; and (3A) turns off the first illumination portion and the second illumination portion when the travel state is forward travel.

Moreover, a second vehicle approach notification device according to the disclosure includes a first illumination portion provided in a cab capable of elevation in a vehicle and irradiating a first notification light toward a road surface behind the vehicle; a second illumination portion provided on a vehicle body incapable of elevation in the vehicle and irradiating a second notification light toward the road surface; and a control unit controlling a lighting state of the first illumination portion and the second illumination portion according to a travel state of the vehicle body and an elevation position of the cab. The control unit (1) turns on or blinks the first illumination portion and turns off the second illumination portion when the travel state is backward travel and the elevation position is lower than a predetermined threshold value; (2) turns off the first illumination portion and turns on or blinks the second illumination portion when the travel state is backward travel or travel stop and the elevation position is equal to or higher than the threshold value; and (3B) turns off the first illumination portion and the second illumination portion when the travel state is travel stop and the elevation position is lower than the threshold value.

A first picking truck according to the disclosure includes a vehicle body including a travel device; a mast provided behind the vehicle body; a cab capable of elevation along the mast; a first illumination portion provided in the cab and irradiating a first notification light toward a road surface behind a vehicle; a second illumination portion provided on the vehicle body and irradiating a second notification light toward the road surface; and a control unit controlling a lighting state of the first illumination portion and the second illumination portion according to a travel state of the vehicle body and an elevation position of the cab. The control unit (1) turns on or blinks the first illumination portion and turns off the second illumination portion when the travel state is backward travel and the elevation position is lower than a predetermined threshold value; (2) turns off the first illumination portion and turns on or blinks the second illumination portion when the travel state is backward travel or travel stop and the elevation position is equal to or higher than the threshold value; and (3A) turns off the first illumination portion and the second illumination portion when the travel state is forward travel.

Moreover, a second picking truck according to the disclosure includes a vehicle body including a travel device; a mast provided behind the vehicle body; a cab capable of elevation along the mast; a first illumination portion provided in the cab and irradiating a first notification light toward a road surface behind a vehicle; a second illumination portion provided on the vehicle body and irradiating a second notification light toward the road surface; and a control unit controlling a lighting state of the first illumination portion and the second illumination portion according to a travel state of the vehicle body and an elevation position of the cab. The control unit (1) turns on or blinks the first illumination portion and turns off the second illumination portion when the travel state is backward travel and the elevation position is lower than a predetermined threshold value; (2) turns off the first illumination portion and turns on or blinks the second illumination portion when the travel state is backward travel or travel stop and the elevation position is equal to or higher than the threshold value; and (3B) turns off the first illumination portion and the second illumination portion when the travel state is travel stop and the elevation position is lower than the threshold value.

Figure 3:
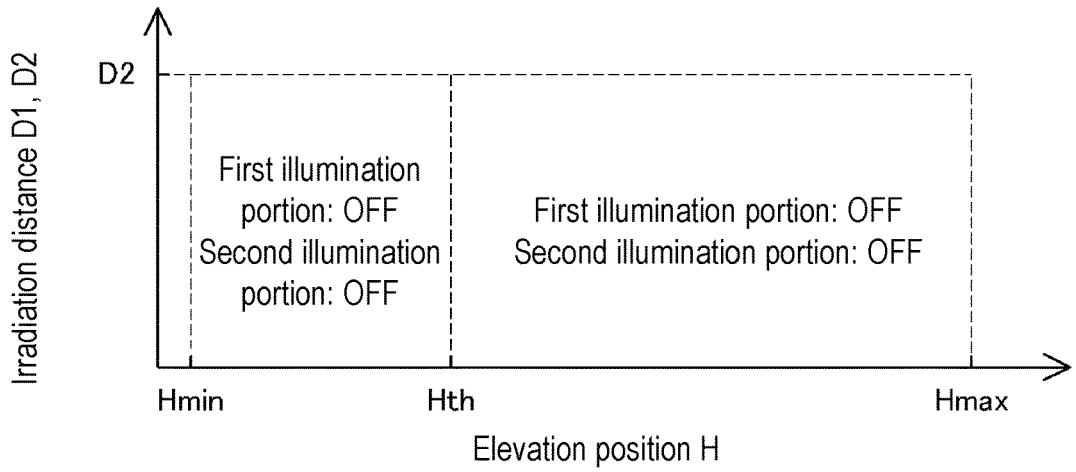
Figure 3:
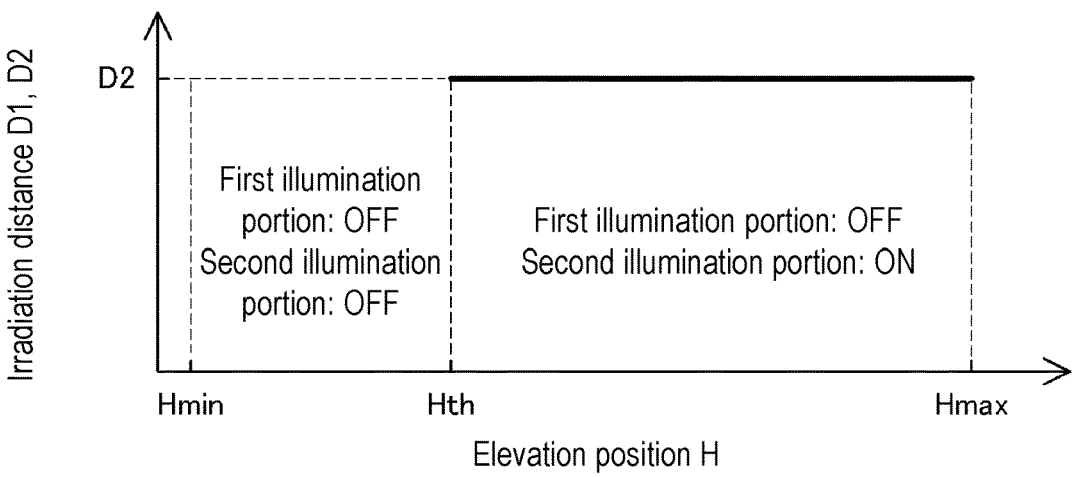
Figure 3:
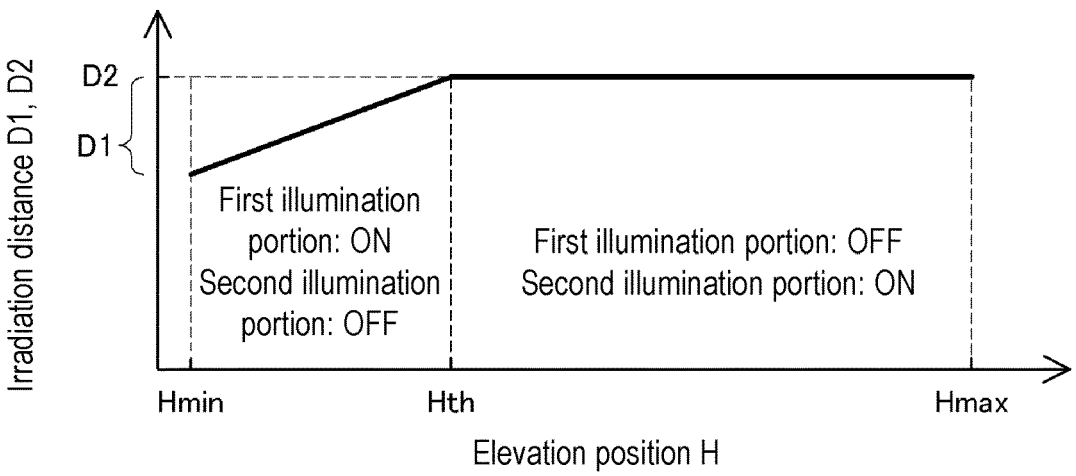

(A) of FIG. 3 is a graph showing changes in lighting state and irradiation distance of each illumination portion according to an embodiment of the disclosure when a travel state is forward travel; (B) of FIG. 3 is a graph showing changes in lighting state and irradiation distance of each illumination portion according to an embodiment of the disclosure when a travel state is travel stop; and (C) of FIG. 3 is a graph showing changes in lighting state and irradiation distance of each illumination portion according to an embodiment of the disclosure when a travel state is backward travel.

Figure 4:
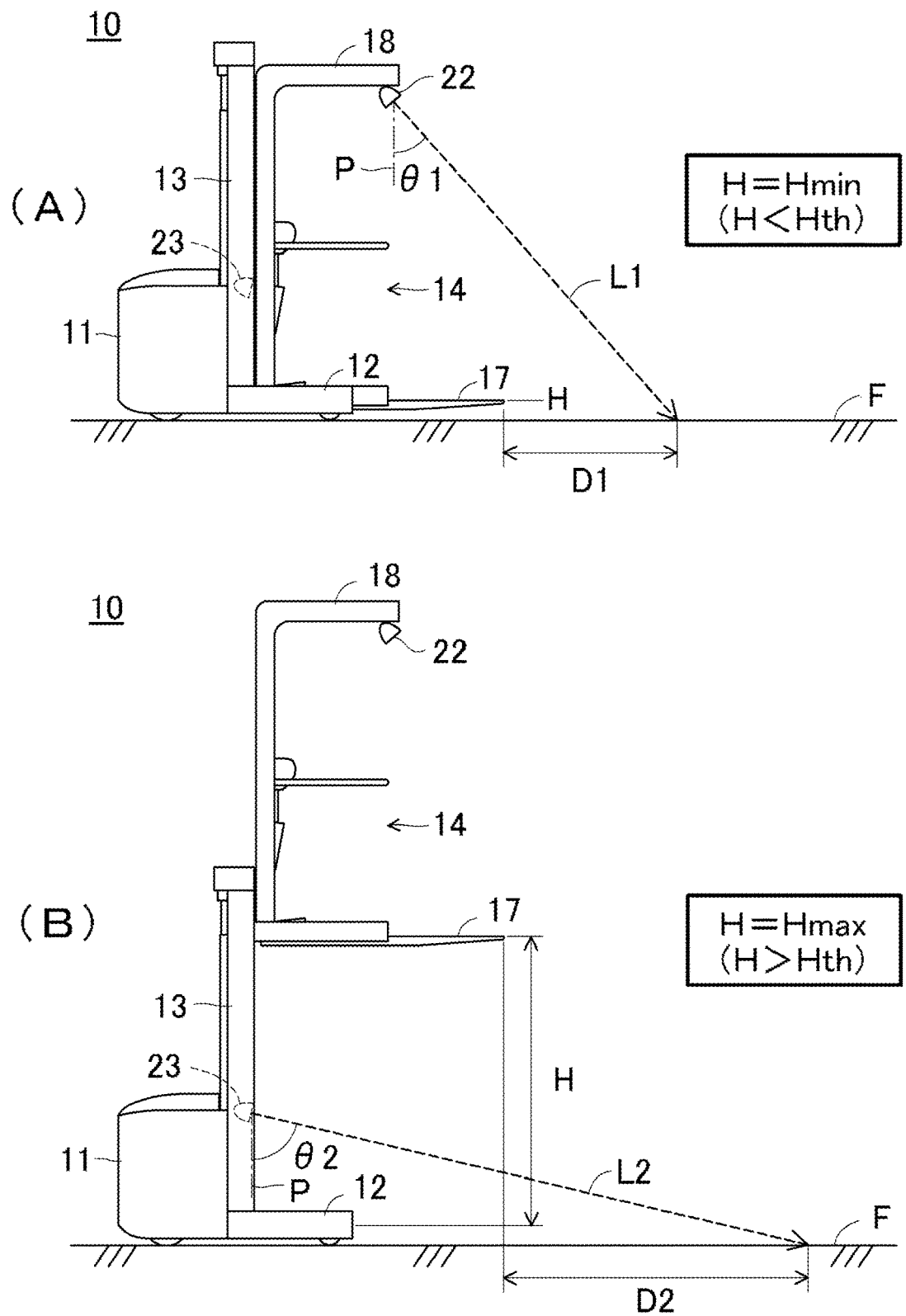

(A) of FIG. 4 is a schematic side view of a picking truck at low lifting height according to an embodiment of the disclosure; and (B) of FIG. 4 is a schematic side view of a picking truck at high lifting height according to an embodiment of the disclosure.

Figure 5:
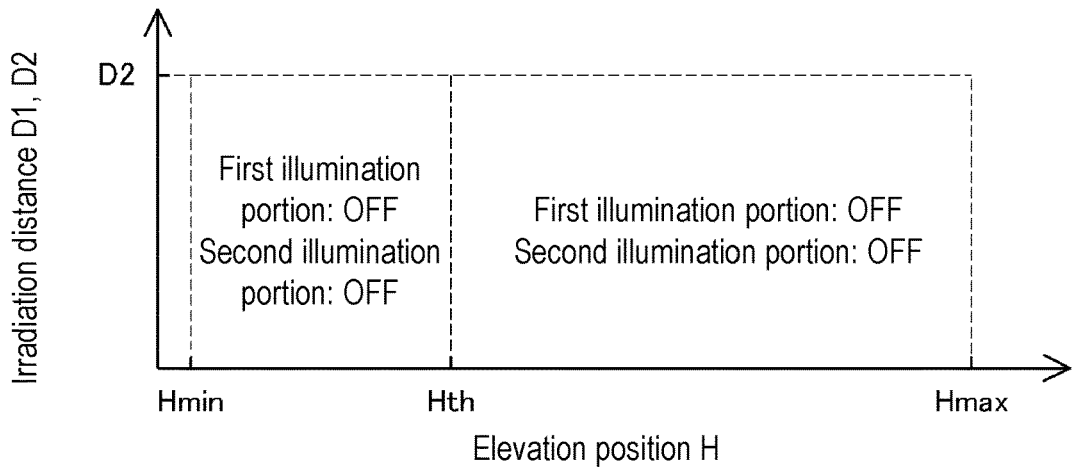
Figure 5:
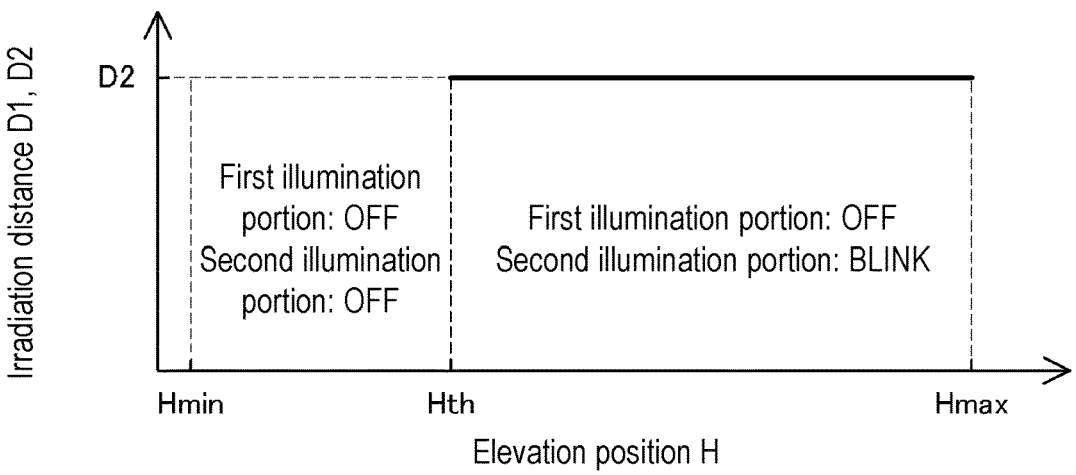
Figure 5:
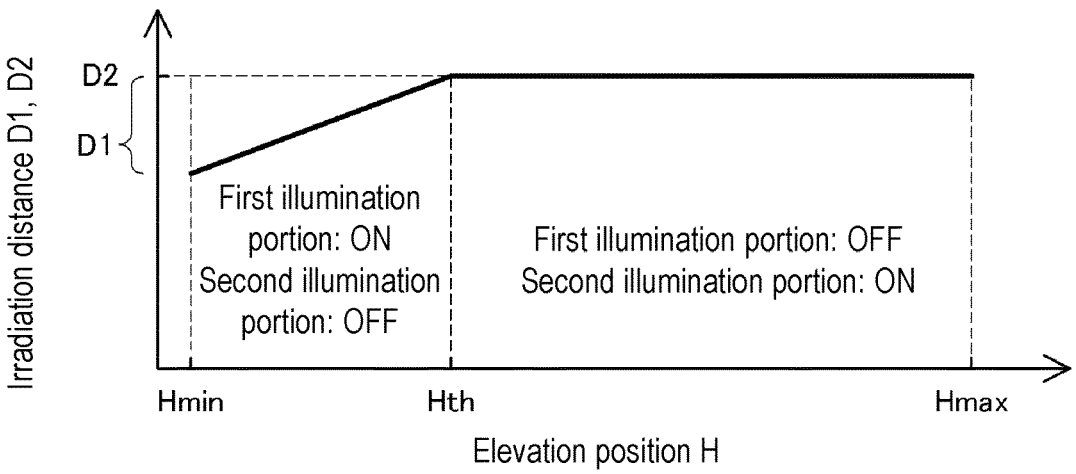

(A) of FIG. 5 is a graph showing changes in lighting state and irradiation distance of each illumination portion in a modified example of the disclosure when a travel state is forward travel; (B) of FIG. 5 is a graph showing changes in lighting state and irradiation distance of each illumination portion in a modified example of the disclosure when a travel state is travel stop, and (C) of FIG. 5 is a graph showing changes in lighting state and irradiation distance of each illumination portion in a modified example of the disclosure when a travel state is backward travel.

DESCRIPTION OF THE EMBODIMENTS

Preferably, the control unit of the first and second vehicle approach notification device (2A) turns off the first illumination portion and turns on the second illumination portion when the travel state is backward travel and the elevation position is equal to or higher than the threshold value; and (2B) turns off the first illumination portion and blinks the second illumination portion when the travel state is travel stop and the elevation position is equal to or higher than the threshold value.

Preferably, the first illumination portion and the second illumination portion of the first and second vehicle approach notification devices are provided such that axes of the first notification light and the second notification light intersect on the road surface when the elevation position is equal to the threshold value.

Preferably, a color of the second notification light of the first and second vehicle approach notification devices is different from a color of the first notification light.

Preferably, the control unit of the first and second picking trucks (2A) turns off the first illumination portion and turns on the second illumination portion when the travel state is backward travel and the elevation position is equal to or higher than the threshold value; and (2B) turns off the first illumination portion and blinks the second illumination portion when the travel state is travel stop and the elevation position is equal to or higher than the threshold value.

The first illumination portion of the first and second picking trucks may be provided on a head guard of the cab.

The first illumination portion and the second illumination portion of the first and second picking trucks are preferably provided such that axes of the first notification light and the second notification light intersect on the road surface when the elevation position is equal to the threshold value.

Preferably, a color of the second notification light for the first and second picking tracks is different from a color of the first notification light.

According to the disclosure, it is possible to provide an vehicle approach notification device and a picking truck that have the same notification effect as that of a conventional device but are more power efficient than the conventional device.

Hereinafter, embodiments of a vehicle approach notification device and a picking truck according to the disclosure will be described with reference to the accompanying drawings.

Example

Figure 1:
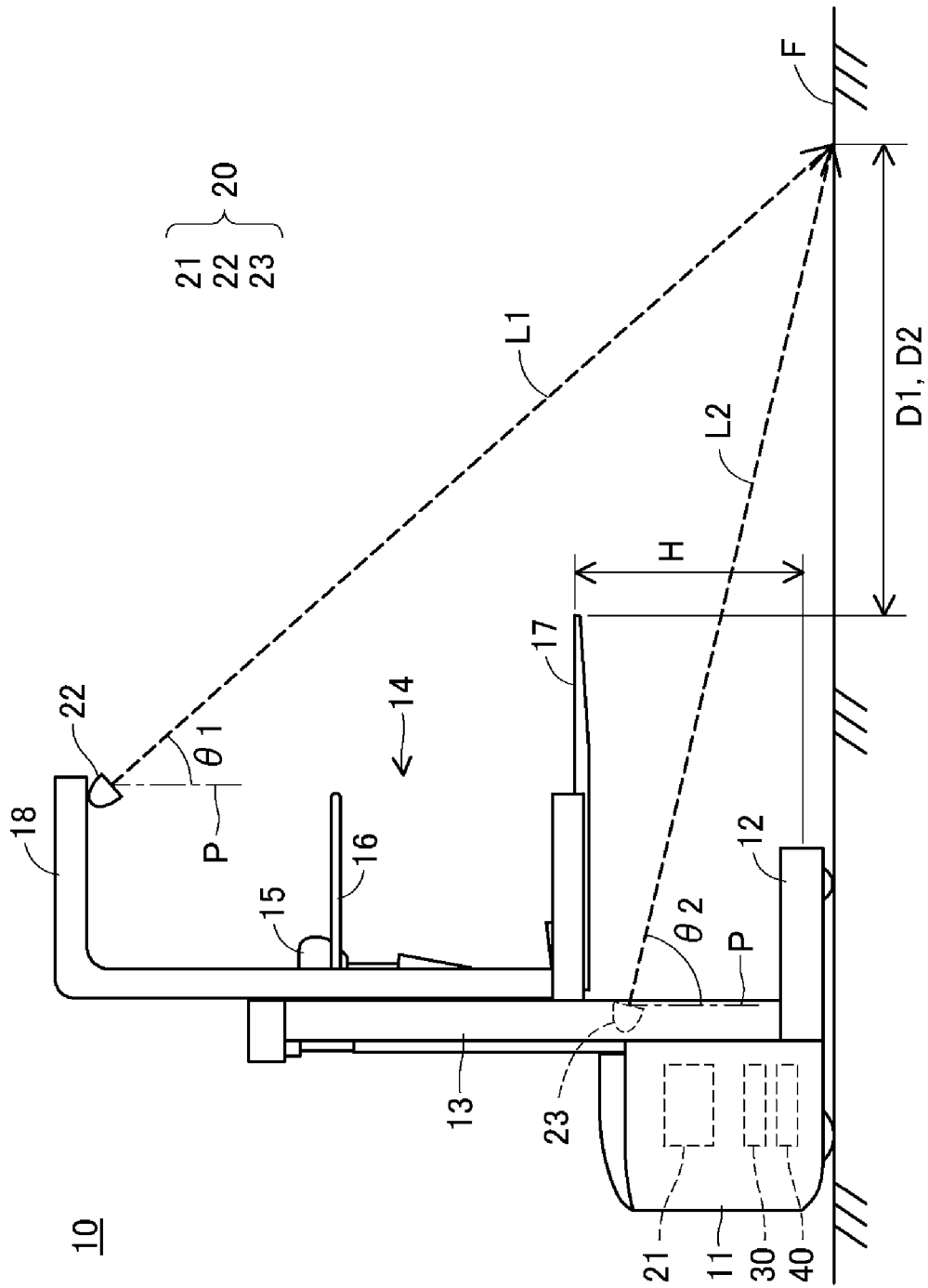
FIG. 1 is a schematic side view of a picking truck according to an embodiment of the disclosure.

FIG. 1 shows a picking truck 10 according to an embodiment of the disclosure. As shown in the drawing, the picking truck 10 according to this embodiment includes a vehicle body 11 having a travel device, legs 12, 12 aligned left and right and a mast 13 provided at the rear of the vehicle body 11; and a cab 14 capable of elevation along the mast 13. The cab 14 includes an operation panel 15 including various levers operated by an operator, a fall guard 16 for preventing the operator from falling; a pair of left and right forks 17, 17 extending rearward; and a head guard 18 that covers an operator's head. The forks 17, 17 are provided on a floor plate of the cab 14.

The picking truck 10 according to this embodiment further includes a control unit 21, a first illumination portion 22, and a second illumination portion 23 which constitute a vehicle approach notification device 20; an elevation position detection portion 30; and a travel state detection portion 40.

The first illumination portion 22 is composed of an LED light that irradiates a first notification light L1 toward a road surface F behind the vehicle. An image of the first notification light L1 appearing on the road surface F may be circular with an ambiguous outline, or it may be spot-shaped, line-shaped, or arrow-shaped with a clear outline by the action of lens or slit provided in the first illumination portion 22. Moreover, the color of the first notification light L1 is preferably a color that stands out against the road surface F in order to enhance the notification effect. In this embodiment, the color of the first notification light L1 is blue.

The first illumination portion 22 is provided at a rear end of the head guard 18 via a suitable bracket (not shown). The first illumination portion 22 is provided such that its irradiation direction (that is, an axis of the first notification light L1) forms an angle 61 with respect to a vertical line P.

The second illumination portion 23 is composed of an LED light that irradiates a second notification light L2 toward the road surface F behind the vehicle. Similar the image of the first notification light L1, an image of the second notification light L2 appearing on the road surface F may be circular with an ambiguous outline, or it may be spot-shaped, line-shaped, or arrow-shaped with a clear outline. Also, the color of the second notification light L2 is preferably a color that stands out against the road surface F, and more preferably different from the color of the first notification light L1 in order to enhance the notification effect. In this embodiment, the color of the second notification light L2 is red.

The second illumination portion 23 is provided behind the vehicle body 11 via a suitable bracket (not shown). The second illumination portion 23 is provided such that its irradiation direction (that is, an axis of the second notification light L2) forms an angle θ2 with respect to the vertical line P (where θ2>θ1).

Figure 2:
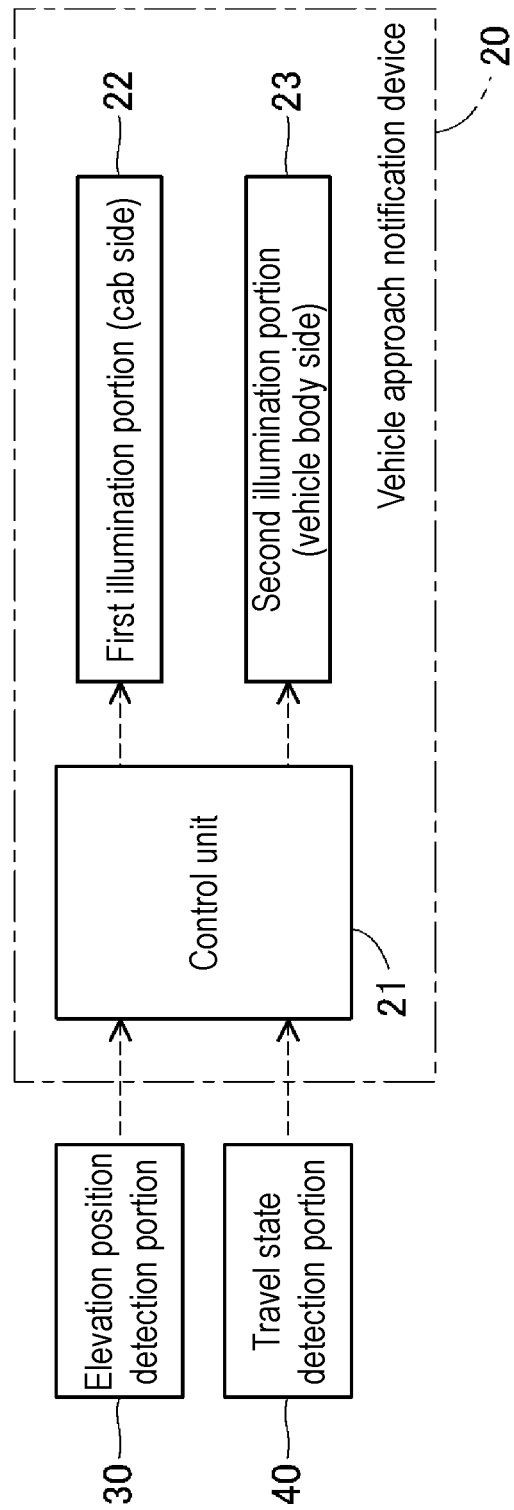
FIG. 2 is a block view of a vehicle approach notification device according to an embodiment of the disclosure.

As shown in FIG. 2, the control unit 21 is configured to change the lighting states of the first illumination portion 22 and the second illumination portion 23 according to an elevation position H of the cab 14 detected by the elevation position detection portion 30 and a travel state of the vehicle body 11 detected by the travel state detection portion 40.

Note that although the control unit 21 is provided inside the vehicle body 11 as shown FIG. 1, the position of the control unit 21 may be changed arbitrarily. For example, the control unit 21 may be provided in the cab 14. Moreover, in FIG. 1, the elevation position detection portion 30 and the travel state detection portion 40 are provided inside the vehicle body 11, but their positions may also be changed arbitrarily.

The operation of the picking truck 10 and the vehicle approach notification device 20 according to this embodiment will be described in more detail with reference to FIGS. 1, 3 and 4.

(1) When the Travel State is Backward Travel and the Elevation Position H is Lower than a Threshold Value Hth In this case, the control unit 21 turns on or blinks the first illumination portion 22 (turns on in this embodiment) and turns off the second illumination portion 23. As a result, a blue image by the first notification light L1 appears on the road surface F. Moreover, an example of "when the elevation position H is lower than a threshold value Hth" is when the elevation position H is equal to a lower limit value Hmin, as shown in (A) of FIG. 4.

A distance D1 from tips of the forks 17, 17 to a center of the image of the first notification light L1 is referred to as a "first irradiation distance". As shown in (C) of FIG. 3, a first irradiation distance D1 changes according to the elevation position H. More specifically, the first irradiation distance D1 becomes longer as the elevation position H becomes higher.

In this embodiment, the threshold value Hth is 1 m. The threshold value Hth is set to a value such that the second notification light L2 is not blocked by the cab 14 when the elevation position H is equal to the threshold value Hth.

(2) When the Travel State is Backward Travel and the Elevation Position H is Equal to or Higher than the Threshold Value Hth In this case, the control unit 21 turns off the first illumination portion 22 and turns on or blinks the second illumination portion 23 (turns on in this embodiment). As a result, a red image by the second notification light L2 appears on the road surface F.

A distance D2 from the tips of the forks 17, 17 to a center of the image of the second notification light L2 is referred to as a "second irradiation distance". In this embodiment, the threshold value Hth and the angles θ1 and θ2 are determined such that the first irradiation distance D1 and a second irradiation distance D2 are equal (see FIGS. 1 and (C) of 3) when the elevation position H is equal to the threshold value Hth. That is, in this embodiment, axes of the first notification light L1 and the second notification light L2 intersect on the road surface F when the elevation position H is equal to the threshold value Hth. As a result, it is possible to prevent the image of the notification light from instantaneously moving when the elevation position H becomes equal to the threshold value Hth, thereby preventing a person in the vicinity from losing sight of the image.

As shown in (C) of FIG. 3, according to the picking truck 10 and the vehicle approach notification device 20 of this embodiment, the second irradiation distance D2 does not change even if the elevation position H changes between the threshold value Hth and an upper limit Hmax. Thus, according to the picking truck 10 and the vehicle approach notification device 20 of this embodiment, there will always be sufficient notification light delivered to the road surface F. In other words, according to the picking truck 10 and the vehicle approach notification device 20 of this embodiment, it is possible to prevent a decrease in the notification effect in the case of high lifting height.

Further, according to the picking truck 10 and the vehicle approach notification device 20 of this embodiment, the color of the image appearing on the road surface F changes according to the elevation position H. While the operator of the picking truck 10 tends to be less aware of people around him in the case of high lifting height, according to the picking truck 10 and the vehicle approach notification device 20 of this embodiment, people in the surroundings will become aware of the high lifting height based on the color of the image appearing on the road surface F and be more cautious of the surroundings, thereby preventing contact with the picking truck 10 by themselves.

(3) When the Travel State is Forward Travel

In this case, the control unit 21 turns off the first illumination portion 22 and the second illumination portion 23 regardless of the elevation position H (see (A) of FIG. 3). As a result, the power consumption in the first illumination portion 22 and the second illumination portion 23 becomes substantially zero.

Since the first illumination portion 22 and the second illumination portion 23 are configured to irradiate light to the road surface F behind the vehicle, they hardly contribute to preventing contact between the picking truck 10 traveling forward and a person in the vicinity. Thus, turning off the first illumination portion 22 and the second illumination portion 23 at forward travel for the purpose of reducing power consumption does not affect the notification effect.

(4) When the Travel State is Travel Stop and the Elevation Position H is Lower than the Threshold Value Hth Also in this case, the control unit 21 turns off the first illumination portion 22 and the second illumination portion 23 (see (B) of FIG. 3). As a result, the power consumption in the first illumination portion 22 and the second illumination portion 23 becomes substantially zero.

There is a low possibility that a person in the vicinity will come into contact with the picking truck 10 that is at travel stop. That is, there is little need to turn on the first illumination portion 22 and the second illumination portion 23 at travel stop. Thus, turning off the lights of the first illumination portion 22 and the second illumination portion 23 at travel stop for the purpose of reducing power consumption does not affect the notification effect.

(5) When the Travel State is Travel Stop and the Elevation Position H is Equal to or Higher than the Threshold Value Hth In this case, the control unit 21 turns off the first illumination portion 22 and turns on or blinks (in this embodiment, turns on) the second illumination portion 23 (see (B) of FIG. 3). As a result, a red image by the second notification light L2 appears on the road surface F.

As described above, there is a low possibility that a person in the vicinity will come into contact with the picking truck 10 that is at travel stop. However, when anyone in the vicinity should happen to come into contact with the picking truck 10 in the case of high lifting height, the cab 14 may shake and the operator working at height may be in danger of falling. In other words, the need for notification is higher in the case of high lifting height than in the case of low lifting height. This is the reason why the second illumination portion 23 is turned on even if the vehicle is at travel stop.

To summarize (1) to (5), the control unit 21 controls the lighting states of the first illumination portion 22 and the second illumination portion 23 as shown in the table below.

TABLE 1

| Travel state | Elevation position H | First illumination portion | Second illumination portion |
| --- | --- | --- | --- |
| Forward | * | OFF | OFF |
| Stop | Lower than Hth | OFF | OFF |
|  | Equal to Hth or higher | OFF | ON |
| Backward | Lower than Hth | ON | OFF |
|  | Equal to Hth or higher | OFF | ON |

Thus, according to the picking truck 10 and the vehicle approach notification device 20 of this embodiment, by turning off both or one of the first illumination portion 22 and the second illumination portion 23 within a range in which the notification effect does not decrease, power consumption in the first illumination portion 22 and the second illumination portion 23 can be reduced.

Modified Example

The embodiment of the vehicle approach notification device and the picking truck according to the disclosure has been described above, but the configuration of the disclosure is not limited thereto.

For example, in the disclosure, when the travel state is travel stop and the elevation position H is equal to or higher than the threshold value Hth, it is preferable that the second illumination portion 23 operates in a lighting state different from the case where the travel state is backward travel and the elevation position H is equal to or higher than the threshold value Hth. For example, in the case where the second illumination portion 23 is turned on when the travel state is backward travel and the elevation position H is equal to or higher than the threshold value Hth, the second illumination portion 23 is preferably blinking when the travel state is travel stop and the elevation position H is equal to or higher than the threshold value Hth, as shown in Table 2 and FIG. 5. According to this configuration, it is possible to notify a person in the vicinity whether the vehicle is at travel stop or at backward travel. Other examples of different lighting states of the second illumination portion 23 include turning on light with different colors, blinking with different frequencies, and the like.

TABLE 2

| Travel state | Elevation position H | First illumination portion | Second illumination portion |
| --- | --- | --- | --- |
| Forward | * | OFF | OFF |
| Stop | Lower than Hth | OFF | OFF |
|  | Equal to Hth or higher | OFF | BLINK |
| Backward | Lower than Hth | ON | OFF |
|  | Equal to Hth or higher | OFF | ON |

Moreover, in the disclosure, the first illumination portion 22 may be provided at any position on the cab 14.

Further, in the disclosure, when the elevation position H is equal to the threshold value Hth, the first irradiation distance D1 and the second irradiation distance D2 do not necessarily have to match.

Also, the color (blue) of the first notification light L1 and the color (red) of the second notification light L2 described above are merely examples. For example, in the disclosure, the colors of the first notification light L1 and the second notification light L2 may be the same.

The aforementioned threshold value Hth (1 m) is also merely an example.

What is claimed is:

1. A vehicle approach notification device, comprising:
a first illumination portion provided in a cab capable of elevation in a vehicle and irradiating a first notification light toward a road surface behind the vehicle;
a second illumination portion provided on a vehicle body incapable of elevation in the vehicle and irradiating a second notification light toward the road surface; and
a control unit controlling a lighting state of the first illumination portion and the second illumination portion according to a travel state of the vehicle body and an elevation position of the cab,
wherein the control unit turns on or blinks the first illumination portion and turns off the second illumination portion when the travel state is backward travel and the elevation position is lower than a predetermined threshold value; turns off the first illumination portion and turns on or blinks the second illumination portion when the travel state is backward travel or travel stop and the elevation position is equal to or higher than the threshold value; and turns off the first illumination portion and the second illumination portion when the travel state is forward travel.

2. The vehicle approach notification device according to claim 1,
wherein the control unit turns off the first illumination portion and turns on the second illumination portion when the travel state is backward travel and the elevation position is equal to or higher than the threshold value; and turns off the first illumination portion and blinks the second illumination portion when the travel state is travel stop and the elevation position is equal to or higher than the threshold value.

3. The vehicle approach notification device according to claim 1,
wherein the first illumination portion and the second illumination portion are provided such that axes of the first notification light and the second notification light intersect on the road surface when the elevation position is equal to the threshold value.

4. The vehicle approach notification device according to claim 1, wherein a color of the second notification light is different from a color of the first notification light.

5. A vehicle approach notification device, comprising:
a first illumination portion provided in a cab capable of elevation in a vehicle and irradiating a first notification light toward a road surface behind the vehicle;
a second illumination portion provided on a vehicle body incapable of elevation in the vehicle and irradiating a second notification light toward the road surface; and
a control unit controlling a lighting state of the first illumination portion and the second illumination portion according to a travel state of the vehicle body and an elevation position of the cab,
wherein the control unit turns on or blinks the first illumination portion and turns off the second illumination portion when the travel state is backward travel and the elevation position is lower than a predetermined threshold value; turns off the first illumination portion and turns on or blinks the second illumination portion when the travel state is backward travel or travel stop and the elevation position is equal to or higher than the threshold value; and turns off the first illumination portion and the second illumination portion when the travel state is travel stop and the elevation position is lower than the threshold value.

6. The vehicle approach notification device according to claim 5,
wherein the control unit turns off the first illumination portion and turns on the second illumination portion when the travel state is backward travel and the elevation position is equal to or higher than the threshold value; and turns off the first illumination portion and blinks the second illumination portion when the travel state is travel stop and the elevation position is equal to or higher than the threshold value.

7. The vehicle approach notification device according to claim 5,
wherein the first illumination portion and the second illumination portion are provided such that axes of the first notification light and the second notification light intersect on the road surface when the elevation position is equal to the threshold value.

8. The vehicle approach notification device according to claim 5,
wherein a color of the second notification light is different from a color of the first notification light.

9. A picking truck, comprising:
a vehicle body comprising a travel device;
a mast provided behind the vehicle body;
a cab capable of elevation along the mast;
a first illumination portion provided in the cab and irradiating a first notification light toward a road surface behind a vehicle;
a second illumination portion provided on the vehicle body and irradiating a second notification light toward the road surface; and
a control unit controlling a lighting state of the first illumination portion and the second illumination portion according to a travel state of the vehicle body and an elevation position of the cab,
wherein the control unit turns on or blinks the first illumination portion and turns off the second illumination portion when the travel state is backward travel and the elevation position is lower than a predetermined threshold value; turns off the first illumination portion and turns on or blinks the second illumination portion when the travel state is backward travel or travel stop and the elevation position is equal to or higher than the threshold value; and turns off the first illumination portion and the second illumination portion when the travel state is forward travel.

10. The picking truck according to claim 9,
wherein the control unit turns off the first illumination portion and turns on the second illumination portion when the travel state is backward travel and the elevation position is equal to or higher than the threshold value; and turns off the first illumination portion and blinks the second illumination portion when the travel state is travel stop and the elevation position is equal to or higher than the threshold value.

11. The picking truck according to claim 9,
wherein the first illumination portion is provided on a head guard of the cab.

12. The picking truck according to claim 9,
wherein the first illumination portion and the second illumination portion are provided such that axes of the first notification light and the second notification light intersect on the road surface when the elevation position is equal to the threshold value.

13. The picking truck according to claim 9,
wherein a color of the second notification light is different from a color of the first notification light.

14. A picking truck, comprising:
a vehicle body comprising a travel device;
a mast provided behind the vehicle body;
a cab capable of elevation along the mast;
a first illumination portion provided in the cab and irradiating a first notification light toward a road surface behind a vehicle;
a second illumination portion provided on the vehicle body and irradiating a second notification light toward the road surface; and
a control unit controlling a lighting state of the first illumination portion and the second illumination portion according to a travel state of the vehicle body and an elevation position of the cab,
wherein the control unit turns on or blinks the first illumination portion and turns off the second illumination portion when the travel state is backward travel and the elevation position is lower than a predetermined threshold value; turns off the first illumination portion and turns on or blinks the second illumination portion when the travel state is backward travel or travel stop and the elevation position is equal to or higher than the threshold value; and turns off the first illumination portion and the second illumination portion when the travel state is travel stop and the elevation position is lower than the threshold value.

15. The picking truck according to claim 14,
wherein the control unit turns off the first illumination portion and turns on the second illumination portion when the travel state is backward travel and the elevation position is equal to or higher than the threshold value; and turns off the first illumination portion and blinks the second illumination portion when the travel state is travel stop and the elevation position is equal to or higher than the threshold value.

16. The picking truck according to claim 14,
wherein the first illumination portion is provided on a head guard of the cab.

17. The picking truck according to claim 14,
wherein the first illumination portion and the second illumination portion are provided such that axes of the first notification light and the second notification light intersect on the road surface when the elevation position is equal to the threshold value.

18. The picking truck according to claim 14, wherein a color of the second notification light is different from a color of the first notification light.

* * * * *